May 23, 1939.   A. HERSHBERGER   2,159,151
METHOD OF MOISTUREPROOFING
Filed July 20, 1933
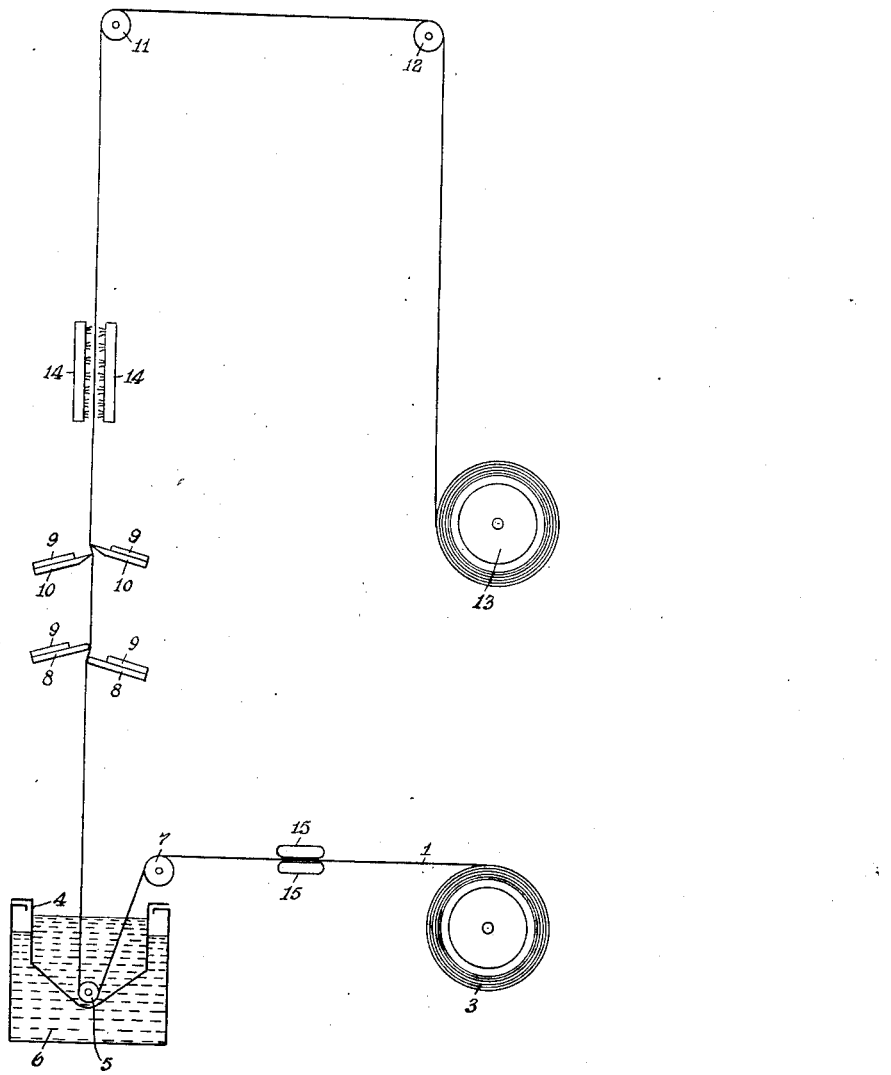

Patented May 23, 1939

2,159,151

UNITED STATES PATENT OFFICE 2,159,151

METHOD OF MOISTUREPROOFING

Albert Hershberger, Kenmore, N. Y., assignor, by mesne assignments, to E. I. du Pont de Nemours & Company, Wilmington, Del., a corporation of Delaware Application July 20, 1933, Serial No. 681,295

15 Claims. (Cl. 91—70)

This invention relates to the manufacture of moistureproof materials which are glass-clear in transparency and intended primarily for use as a wrapping tissue, though capable of divers uses, such as windows in window envelopes or boxes, in the production of laminated material, etc. More particularly, the instant invention relates to a method of applying the moistureproofing composition in the form of a melt to the selected base.

Prior to the instant invention, paper was waxed by passing it through a molten mass of paraffin and then subsequently subjecting the coated paper to a chilling operation, such as subjecting the coated material to chilling rolls. The product from such a process was not transparent. This was not surprising when the nature of the materials employed in the process and constituting the final product were considered.

The inherent nature of most waxes is crystalline. Even the paraffins exhibit crystallinity. Even if the individual crystal of the paraffin is transparent, due to heterogeneous arrangement thereof a piece of any paraffin is opaque or, at the very best, only translucent. Even thin shavings of paraffin are at best only translucent. The paper which is commonly used in the production of waxed paper, largely due to fibrous structure thereof, also prevents the manufacture of a glass-clear transparent product.

Certain waxed papers are popularly but incorrectly termed "transparent." The term "transparent" as popularly and loosely applied to waxed paper is by no means to be taken to mean glass-clear transparency. On the contrary, these waxed papers are, for reasons previously explained, at best, only translucent.

The prior art procedure of waxing papers, above briefly described, when applied to a base formed of a transparent, non-porous, smooth surface material, such as sheets or films of regenerated cellulose, produces at best only a translucent product.

I have found that by applying a melt comprising a moistureproofing wax or mixture thereof containing modifying agents serving to impart certain desirable characteristics to the coating, with or without blending agents, to a base formed of a transparent, non-porous and smooth surface material, removing the excess composition and, either simultaneously or subsequently with the excess removal, smoothing and imparting a gloss to the coating while it is in the molten condition, and then solidifying the coating, preferably immediately after the smoothing operation and prior to permitting it to engage any mechanical elements or liquid baths, I can produce a thinly coated product which is not only glass-clear in transparency but also moistureproof and possesses the necessary characteristics to make it suitable for wrapping purposes, etc.

It is therefore an object of this invention to make a glass-clear transparent moistureproof material by applying the moistureproofing composition from a heated melt.

Other objects of the invention will become apparent from the following description, appended claims and accompanying drawing forming a part of this specification and wherein the figure is a side elevation of an illustrative apparatus which is capable of carrying out the method constituting the invention.

In accordance with the principles of the instant invention, a composition, more fully explained hereafter, in the molten state is applied to a base formed of a transparent, non-porous, smooth surface cellulosic material, for example, a sheet or film of regenerated cellulose. Before the composition has had time to set, the excess thereof is removed in any suitable and convenient manner, and, either simultaneously or preferably subsequently to the excess removing operation, the coating while still in the molten condition is smoothed and a gloss imparted thereto. Subsequently, the coating is permitted to set by travel in the air or preferably by projecting thereon a blast of any suitable chilling medium, such as air. After the coating has been set and where the base is of the type which loses moisture during the process, which is the case when regenerated cellulose constitutes the base, the coated material may be given a humidifying treatment in a warm moist atmosphere to restore or increase the original flexibility of the base. Finally, the coated film is wound on a wind-up device. It is to be noted that the coating, while in the molten state, does not engage with any mechanism or liquid bath other than the surplus-removing device and the smoothing, etc. device until it is in the set condition.

It is to be noted that in the process described in the immediately preceding paragraph the wax film or coating is laid down in a glass-clear transparent state. In so far as the prior art is concerned, when a wax coating or film was laid down it was generally opaque, and, at the very best, only translucent.

As is apparent from the foregoing, the method contemplates the application of a composition in the molten state. In its simplest form, the composition comprises a melt including a moistureproof waxy substance, or mixture thereof, with modifying agents serving to impart certain desirable characteristics to the final coating, such as color, hardness, slip, heat-sealing characteristics, etc. The composition may also contain blending agents, that is, transparentizing, clearing or homogenizing agents.

As the moistureproofing ingredient, any wax or wax-like or waxy substance capable of moistureproofing may be used. The paraffins, and preferably the high melting point paraffins, such as those melting over 50° C., such as 55° C. and preferably approximately 60° C. or over, are preferred, since they produce coatings which are characterized by very effective moistureproof qualities, improved slip, and freedom from smear when compared to the lower melting paraffins. Some of these high melting paraffins are commercial products. When, however, the still higher melting point paraffins are desired, they may be obtained, for example, from commercial paraffins by suitable treatment. For instance, the low melting fractions of commercial paraffins may be "sweated out" or fractionated out by means of solvents, or they may be removed by distillation so as to yield a relatively high melting, hard, white, crystalline type of paraffin. Though the hard and high melting point paraffins are definitely preferred, ceresins and some of the hard synthetic or manufactured waxes, for instance, various derivatives of the montan waxes or montanic acid, may be used as alternatives. The moistureproofing waxes may be used singly or in combination, as may be desired.

As modifying agents, the particular ingredients depend on the desired property in the final coating. Thus, if a hard coating is desired, hard waxes may be used in the composition. As illustrative examples of hard waxes may be mentioned refined carnauba wax, candelilla wax, the montan waxes or synthetic derivatives of montan wax, bayberry wax, Brazil wax, Glyco-Wax B-430, etc. Obviously, the hard waxes may be used either singly or mixed. Where a mixture of a moistureproofing wax, such as a high melting point paraffin and a hard wax, is employed, the balance between these two waxes is determined with reference to their properties. For instance, a very high melting paraffin requires less wax than does a somewhat lower melting point paraffin. The quantity of paraffin is generally in excess of 30% of the total formula and ordinarily not less than approximately 50% of the total formula.

The following are set forth as illustrative examples of this type of composition:

*Example I*

| | Parts |
|---|---|
| Paraffin (melting point 60°–61° C.) | 50 |
| Refined carnauba wax | 50 |

*Example II*

| | Parts |
|---|---|
| Paraffin (melting point 64° C.) | 80 |
| Refined carnauba wax | 20 |

*Example III*

| | Parts |
|---|---|
| Paraffin (melting point 55°–57° C.) | 30 |
| Refined carnauba wax | 70 |

Certain resins, both natural and synthetic, also constitute another class of modifying agents which serves to increase the hardness of the coatings. Resins also tend to improve the brilliancy and gloss of the coating. In general, in such a composition the resins constitute a minor portion of the composition. Obviously, a number of resins can be employed. The resins which are preferred are characterized by complete solubility in hydrocarbons. Other resins, such as ester gum, rosin, hydrogenated ester gum, vinyl types of resin which have been so modified as to cause them to be soluble or capable of being dispersed in melted wax, oil-soluble alkyd resins, more especially the harder variety, and the chlorinated diphenyl resins are several additional examples of other resins which may be used.

In determining the limits of this composition (resin-wax), the quantity of resin used will be less than the quantity of the moistureproofing wax. In general, the resin will not constitute more than 30% of the total formula. Satisfactory results have been secured when 20% of resins has been used. The following is set forth as an illustrative embodiment of this type of composition:

*Example IV*

| | Parts |
|---|---|
| Paraffin (melting point 60°–61° C.) | 80 |
| Gum dammar (either de-waxed or not) | 20 |

Resins may also be employed in compositions comprising a moistureproofing wax and a hard wax as the hardening agent. In such compositions, the resins will also serve as blending agents. When resins of the film-forming type are used, the coating shows an improved water resistance when compared to coatings in which a resin, such as dammar, is employed. Also, some of the resins, particularly those of the film-forming type and/or thermoplastic type, also contribute to the heat-sealing properties of the formula. In such formulas the total percent of resin will generally be less than the total percent of the hardening wax. In compositions of this type, the resin will not comprise more than 20% of the total solids. Generally, the amount of hard wax will predominate over the amount of resin. As illustrative examples of this type of composition, the following illustrative embodiments are set forth:

*Example V*

| | Parts |
|---|---|
| Paraffin (melting point 64° C.) | 85 |
| Refined carnauba wax | 10 |
| Ester gum | 5 |

*Example VI*

| | Parts |
|---|---|
| Paraffin (melting point 60°–61° C.) | 45 |
| Refined carnauba wax | 45 |
| Gum dammar | 10 |

As above mentioned, the resins also serve as blending agents. In place of resins, other blending agents, such as hydrogenated castor oil, hydrogenated cocoanut oil, hydrogenated cottonseed oil, stearic acid, anhydrous wool grease, etc., or such materials as diphenyl or B-naphthol where a slight odor is not objectionable, may be used. These blending agents are generally used in minor quantities. They may constitute as much as 20% of the composition, although between 5% and 15% is the preferred range. In some cases where the material is oily or a low melting grease, the quantities used are even less than 5%. This is desirable in order to avoid sticky surfaces. The aforementioned blending agents have somewhat the same general effect as a resin in improving gloss and brilliancy. As specific examples of these types of composition, the following embodiments are set forth:

Example VII

| | Parts |
|---|---|
| Paraffin (melting point 64° C.) | 60 |
| Candelilla wax | 25 |
| Hydrogenated castor oil | 15 |

Example VIII

| | Parts |
|---|---|
| Paraffin (melting point 61°-62° C.) | 50 |
| Candelilla wax | 40 |
| Diphenyl | 10 |

To achieve other properties in the coatings mentioned, other modifying agents may be employed. For example, dyes or pigments may be incorporated in the melts to secure color effects or translucency as would be furnished by certain types of pigments. To improve the surface slip of the coating, small quantities of metallic soaps, such as less than 10% of zinc or aluminum stearate, may be used. Small quantities, such as 2%-10%, of thermoplastic cellulose derivatives, such as ethyl cellulose, benzyl cellulose and cellulose butyrate, may be employed to increase the heat-sealing effect of the coating.

Optionally, small quantities of softening agents, such as mineral oils, high boiling odorless organic liquids or low melting solids may be employed.

If desired, small quantities of materials, such as triethanolamine or triethanolamine soaps, which tend to lower the surface tension between the melt and the base to be coated, may be employed.

The composition above described may, if desired, contain a minor quantity of a solvent, such as hydrocarbons or chlorinated hydrocarbons. The solvent in such composition is usually present in an amount not exceeding the total quantity of the solid film-forming ingredient and generally to an extent of 25%-50% of the total mass, solids and solvents. The use of these solvents does not destroy the character of the mass as a melt. They are used for the purpose of improving the appearance of the final coated sheet, obviating some of the difficulties encountered at times during coating and the streaks in the finished product.

Referring now to the drawing, wherein one embodiment of an apparatus which has been used to carry out the method is illustrated, the reference numeral 3 designates a supply roll of a base material I which is to be coated and from which it is fed into a tank 4 containing a molten composition and below the freely rotatable roller 5 mounted therein. The tank 4 is provided with any suitable heating mechanism, whereby the composition may be melted or, if previously melted, maintained in a melted condition. In the embodiment shown in the drawing, the contents in the tank 4 is heated in any suitable manner, such as through the medium of an electrically heated oil bath.

Prior to the immersion of the base I into the molten mass, it may be fed over one or more guide rolls 7.

From the bath, the base I, provided with a molten coating, passes preferably in a vertical direction through heated doctor knives 8, 8 having rounded or blunt scraping edges, whereby the excess composition is removed. The knives 8, 8 are heated in any suitable manner, such as by electrical heating units 9, 9, and are maintained at a temperature at least equal to and preferably above the melting point of the wax in the composition. In addition to serving to remove the excess composition from the base, the knives 8, 8 also serve to smooth and impart a glossy surface to the coating.

If desired, a second set of knives 10, 10 may be employed in conjunction with the knives 8, 8. The knives 10, 10 are also heated in any appropriate manner, such as by electrical heating elements 9, 9, and are provided with edges which have a shorter radius of curvature and, therefore, are sharper than those of knives 8, 8, and which serve to smooth and impart a glossy surface to the coating without removing the coating from the base.

When the two sets of knives are employed, the first set, i. e. 8, 8, functions as the surplus-removing element, and the second set, i. e. 10, 10, functions as described.

The knives 8, 8 and 10, 10 are preferably made of hard metal. They are highly polished and are made as true as possible. In the apparatus illustrated, the knives are slightly overlapped, so that the excess composition which is removed depends upon the friction of the sheet upon the knives.

The knives 10, 10 are disposed sufficiently close to the first set of knives 8, 8 so that there is no appreciable temperature drop on the coated sheet from the time it passes from the first to the second set of knives. In other words, the wax mixture on the sheet is still in the molten condition by the time it reaches the second set of heated knives 10, 10. If desired, the knives 8, 8 and 10, 10 may be suitably encased. Obviously, a plurality of sets of knives 10, 10 may be used if desired.

Experimental evidence at this time shows that when the coating is smoothed, etc., either by the knives 8, 8 or the knives 10, 10 under the conditions described, the wax molecules tend to become oriented in such a manner that their carbon chains stand more or less perpendicular to the surface of the film.

After leaving the knives 10, 10, the coated sheet is advanced vertically upward for a distance sufficient to permit the coating to solidify before it engages the guide or roll 11. This is important and critical, since, if the coating were not solidified at the time it engages the roll, it would be smeared or otherwise impaired. From the roll 11 the coated sheet passes to another coated roll 12 and is finally wound upon a take-up device 13.

When the base is of the type which loses mixture during the process, prior to the winding up on the take-up device 13, the coated film may be subjected to a humidifying treatment in a warm moist atmosphere.

In order to ensure and accelerate the solidification of the coating prior to engaging the roll 11, the coated material may be positively cooled, such as by projecting a cooling medium through the nozzles 14 on to the coated film after it leaves the last doctor knives. A positive cooling is preferred, since this serves to improve the transparency and/or gloss of the final product.

Since the amount of the wax deposited on the sheet is regulated by the contact of the surplus-removing knife mechanism 8, 8, it is advantageous and desirable to regulate the tension on the sheet as it runs through the machine, so that it will be constant at all times. With a fair tension on the base sheet, the latter throughout its entire width will lie flat or rub uniformly against the knife at all points where the knife touches it and with a fairly uniform pressure against the knife. Obviously, this serves to provide a uniform coating and inhibits different amounts of coating deposited on the film. The tension may be controlled and regulated by an appropriate means, such as by suitable braking mechanisms (not shown) cooperating with the roll 13.

It is advantageous to use a roll of film which has been cut with a shear cut so that there will be no slivers or loose shreds of the material which will contaminate the coating bath and which later might be carried up, lodging underneath the knives and causing streaks. It is also advisable to pass the material to be coated through one or more dust and dirt removers or wipers 15 which will collect and remove any extraneous materials, including particles of dust or dirt, which might contaminate the bath. The melt should also be protected from falling dust, dirt and other foreign particles in any suitable manner.

When the method and apparatus described are employed, it frequently happens that small particles of foreign material or dirt lodge beneath the knife and between it and the sheet being coated, thus leaving intermittent streaks in the final product after it is cooled. If there were absolutely no foreign particles in the melt and it could be kept absolutely clean at all times, and if there were absolutely no flaws or defetcs in the knives, there would, of course, be obtained a uniform coating free from streaks or knife scratches. In a practical way, this extreme degree of cleanliness and perfection cannot always be achieved, particularly on a large commercial scale of operation where thousands of feet of film are being run through a bath continuously. I have found that a considerable portion of these small streaks or scratches can be overcome by the use of a melt containing minor quantities of solvents and by applying the melt by the method herebefore described with no further precautions than those already mentioned. These solvents being present in relatively small amounts evaporate from the film quite easily and readily after the film leaves the last pair of doctor knives and before it has been wound up. It may or may not be necessary to use special precautions to drive out these solvents depending on the solvent and/or the set conditions under which the apparatus is operated. These solvents, of course, can be recovered, but usually the quantity is so small that no substantial cost is added to the process by their loss. The use, however, does have a positive effect in producing a film more clearly free from scratches and streaks than is secured without the use thereof.

By regulating the surplus-removing knives and the tension, the thickness of the coating deposited may be varied within wide limits. When the base is formed of a sheet or film of regenerated cellulose having a thickness of 0.0009 inch, satisfactory results are secured if the total thickness of the coating, on both sides, is between 0.00001 and 0.00015 inch, depending on the formula of the composition and the process used. Highly satisfactory results are secured when the total thickness of the coating on both sides is 0.00003–0.00005 inch.

Though the method has been described specifically in connection with the coating of sheets or films of regenerated cellulose and though this is the preferred embodiment of the invention, it is to be understood that the invention is not restricted thereto. The principles of the instant invention may be applied to any transparent, non-porous, smooth surface material, such as sheets or films of cellulose derivatives, for example, sheets or films of cellulose nitrate, cellulose acetate, cellulose ethers, or sheets or films of albuminous material, such as gelatin, agar-agar, casein, sheets or films made of a rubber derivative, etc. The product resulting from the instant invention is moistureproof, flexible, possesses good gloss, is heat sealable for certain purposes where a strong and rugged joint is not required, and, in the preferred embodiment, also glass clear in transparency. The coated sheets also possess good slip so that they will slip easily one over the other. They are also free from an objectionable degree of smearing and are sufficiently hard so as to withstand objectionable marring or smearing either in stacks or on rolls under ordinary temperature conditions. The coated sheets are, moreover, free from all foreign odors and are entirely suitable for baked goods which is probably the most critical trade on odors. Likewise, the sheets are tasteless and non-toxic to an extent sufficient to pass any baked goods standard.

By the term "moistureproof" as employed in this specification is meant the ability of a sheet or film of regenerated cellulose of a thickness of 0.0009 inch and having a coating on both sides, the total thickness of both coatings not exceeding 0.00015 inch to resist the passage or penetration of moisture or water vapor therethrough to an extent at least 10 times, and preferably 15, 20, 30, 40, 50, 100 or indeed more times, as effective as a sheet or film of regenerated cellulose of the same thickness when tested in accordance with the test set forth in the Journal of Industrial and Engineering Chemistry on page 575, vol. 21, No. 6 (June 1929).

Since it is obvious that various changes and modifications may be made in the above description without departing from the nature or spirit thereof, this invention is not restricted thereto except as set forth in the appended claims.

I claim:

1. A method of preparing a thin, glass-clear transparent, and glossy wax film which comprises coating a base with a molten composition comprising a wax, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

2. A method of preparing a thin, glass-clear transparent, and glossy wax film which comprises coating a base with a molten composition comprising a wax and a substance which imparts desirable characteristics to the coating, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

3. A method of preparing a thin, glass-clear transparent, and glossy wax film which comprises coating a base with a molten composition comprising a wax, a substance which imparts desirable characteristics to the coating and a blending agent, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

4. A method of preparing a moistureproof material having a thin, glass-clear transparent, and glossy wax coating which comprises coating a base with a molten composition consisting of not less than 30%, by weight, of paraffin wax and one or more substances in an amount to impart desirable surface characteristics, including at least good slip and sufficient hardness to withstand marring or smearing under ordinary temperature conditions, to the final coating, removing the excess composition from said base and treating the coating to render it smooth and glossy with doctor knives heated to a temperature at least equal to the melting point of the wax in the composition and while the coating is still in the molten condition, and subsequently causing the coating to set and solidify before contacting with any elements which might tend to destroy any of the desirable characteristics of the coating.

5. A method of preparing a moistureproof material having a thin, glass-clear transparent, and glossy wax coating which comprises coating a base with a molten composition consisting of not less than 30%, by weight, of paraffin wax and one or more substances in an amount to impart desirable surface characteristics, including at least good slip and sufficient hardness to withstand marring or smearing under ordinary temperature conditions, to the final coating, removing the excess composition from said base and treating the coating to render it smooth and glossy with devices heated to a temperature at least equal to the melting point of the wax in the composition and while the coating is still in the molten condition, and subsequently causing the coating to set and solidify before contacting with any elements which might tend to destroy any of the desirable characteristics of the coating.

6. A method of preparing a moistureproof material having a thin, glass-clear transparent, and glossy wax coating which comprises coating a base formed of a transparent, smooth-surface and non-porous substance with a molten composition comprising a wax, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

7. A method of preparing a moistureproof material having a thin, glass-clear transparent, and glossy wax coating which comprises coating a base formed of a transparent, smoot-surfaced and non-porous substance with a molten composition comprising a wax and a substance which imparts desirable characteristics to the coating, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its pasage between said doctor knives, and subsequently causing the coating to set and solidify before contacting with any elements which might tend to destroy any of the desirable characteristics of the coating.

8. A method of preparing a moistureproof material having a thin, glass-clear transparent, and glossy wax coating which comprises coating a base formed of a transparent, smooth-surfaced and non-porous substance with a molten composition consisting essentially of paraffin, a hard wax and a blending agent in proportions to produce a thin, glass-clear transparent and glossy coating having good slip and sufficient hardness to withstand marring or smearing under ordinary temperature conditions, removing the excess composition from said base and treating the coating to render it smooth and glossy with doctor knives heated to a temperature at least equal to the melting point of the wax in the composition and while the coating is still in the molten condition, and subsequently causing the coating to set and solidify before contacting with any elements which might tend to destroy any of the desirable characteristics of the coating.

9. A method of preparing a moistureproof material having a thin, glass-clear transparent, and glossy wax coating which comprises coating a base formed of a transparent, smooth-surfaced and non-porous substance with a molten composition consisting essentially of paraffin, a hard wax and a blending agent in proportions to produce a thin, glass-clear transparent and glossy coating having good slip and sufficient hardness to withstand marring or smearing under ordinary temperature conditions, removing the excess composition from said base and treating the coating to render it smooth and glossy with devices heated to a temperature at least equal to the melting point of the wax in the composition and while the coating is still in the molten condition, and subsequently causing the coating to set and solidify before contacting with any elements which might tend to destroy any of the desirable characteristics of the coating.

10. A method of preparing a moistureproof material having a thin, glass-clear transparent, and glossy wax coating which comprises coating a base formed of a transparent, smooth-surfaced and non-porous substance with a molten composition comprising a wax, a substance which imparts desirable characteristics to the coating and a blending agent, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

11. A method of preparing a moistureproof material having a thin, glass-clear transparent, and glossy wax coating which comprises coating a base sheet of regenerated cellulose with a molten composition consisting of 50 parts of paraffin (melting point 60°–61° C.) and 50 parts of carnauba wax, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

12. A method of preparing a moistureproof material having a thin, glass-clear transparent, and glossy wax coating which comprises coating a base sheet of regenerated cellulose with a molten composition consisting of 80 parts of paraffin (melting point 60°–61° C.) and 20 parts of gum dammar, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

13. A method of preparing a moistureproof material having a thin, glass-clear transparent, and glossy wax coating which comprises coating a base sheet of regenerated cellulose with a molten composition consisting of 45 parts of paraffin (melting point 60°–61° C.), 45 parts of carnauba wax, and 10 parts of gum dammar, successively passing the coated base between a pair of oppositely disposed doctor knives heated to a temperature at least equal to the melting point of the wax in the composition and between another pair of oppositely disposed doctor knives heated to a temperature at least equal to the melting point of the wax in the composition and having edges which are rounder or sharper than the edges of the first-mentioned doctor knives, the coating being in the molten condition during its passage between said doctor knives, and subsequently causing the coating to set and solidify before contacting with any elements which might tend to destroy any of the desirable characteristics of the coating.

14. The method of enhancing the transparency of a moistureproof coating comprising in excess of 30% of a moistureproofing wax and not more than 30% of a resin after the coating has been melted and applied while hot on the selected base material, the proportions being by weight and based on the total formula, which method comprises smoothing the coating with devices heated to a temperature at least equal to the melting point of the wax in the composition, and then immediately chilling said coating.

15. The method of enhancing the transparency of a moistureproof coating comprising in excess of 30% of a moistureproofing wax and not more than 30% of a resin after the coating has been melted and applied while hot on the selected base material, the proportions being by weight and based on the total formula, which method comprises smoothing the coating with doctor knives heated to a temperature at least equal to the melting point of the wax in the composition, and then immediately chilling said coating.

ALBERT HERSHBERGER.

CERTIFICATE OF CORRECTION.

Patent No. 2,159,151. May 23, 1939.

ALBERT HERSHBERGER.

It is hereby certified that error appears in the printed specification of the above numbered patent requiring correction as follows: Page 3, second column, line 53-54, for the word "mixture" read moisture; page 4, first column, line 28, for "defetcs" read defects; page 5, second column, line 14, claim 7, for "smoot-surfaced" read smooth-surfaced; and that the said Letters Patent should be read with this correction therein that the same may conform to the record of the case in the Patent Office.

Signed and sealed this 20th day of June, A. D. 1939.

(Seal)

Henry Van Arsdale
Acting Commissioner of Patents.